US006457366B1

(12) United States Patent
Hidaka et al.

(10) Patent No.: US 6,457,366 B1
(45) Date of Patent: Oct. 1, 2002

(54) MOVEMENT CONTROL MECHANISM OF CONTACT-TYPE VIBRATING PROBE

(75) Inventors: Kazuhiko Hidaka, Tsukuba (JP); Kaoru Matsuki, Tsukuba (JP); Kiyokazu Okamoto, Tsukuba (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 09/540,051

(22) Filed: Mar. 31, 2000

(30) Foreign Application Priority Data

Apr. 2, 1999 (JP) .......................................... 11-096377
Apr. 8, 1999 (JP) .......................................... 11-101149

(51) Int. Cl.[7] ............................................. G01N 29/00
(52) U.S. Cl. ....................................................... 73/634
(58) Field of Search ........................... 73/632, 633, 634

(56) References Cited

U.S. PATENT DOCUMENTS

| 3,678,736 A | * | 7/1972 | May .............................. 73/634 |
| 4,398,425 A | * | 8/1983 | Matzuk ......................... 73/633 |
| 4,470,307 A | * | 9/1984 | Genter et al. .................. 73/634 |
| 4,913,155 A | * | 4/1990 | Dow et al. .................. 128/660.1 |
| 4,980,872 A | * | 12/1990 | Oler et al. ..................... 367/173 |

FOREIGN PATENT DOCUMENTS

| JP | 6221806 | 8/1994 |
| JP | 10022047 | 8/1999 |

* cited by examiner

*Primary Examiner*—Richard A. Moller
(74) *Attorney, Agent, or Firm*—Webb Ziesenheim Logsdon Orkin & Hanson, P.C.

(57) ABSTRACT

A movement control mechanism of contact-type vibrating probe is provided, where the contact-type vibrating probe can be used as a probe for profiling measurement and continuous measurement and configuration of a workpiece can be measured with high accuracy. The movement control mechanism for controlling movement of a support body (23) which moves a contact-type vibrating probe (100) having high detection accuracy includes a vibrator for vibrating the stylus in an axial direction, a detector (5) for detecting a vibration of the stylus by the vibrator, second vibrator for vibrating the stylus in a direction approximately parallel to an end surface of the workpiece, and a controller (31) for controlling movement of the support body (23) so that change in state quantity of a detection signal detected by the detector is constant.

15 Claims, 15 Drawing Sheets

F I G. 15
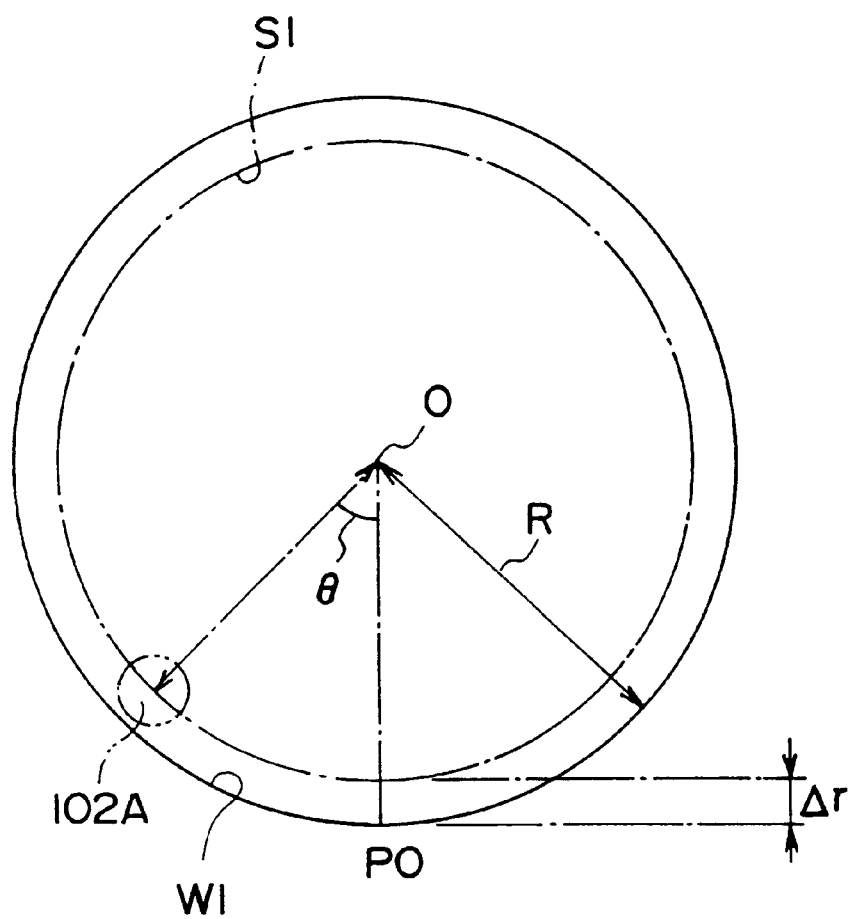

F I G. 20
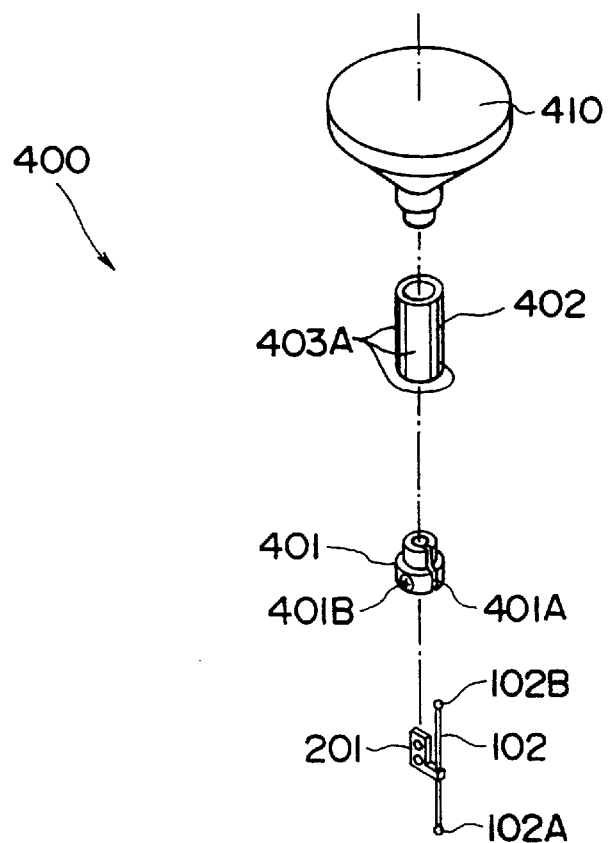
F I G. 21
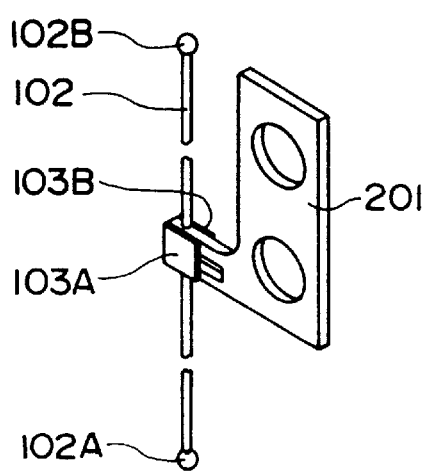

MOVEMENT CONTROL MECHANISM OF CONTACT-TYPE VIBRATING PROBE

BACKGROUND OF THE INVENTION

1. Field of the Invention

The present invention relates to a movement control mechanism for a contact-type vibrating probe for controlling the movement of a contact-type vibrating probe, the contact-type vibrating probe having a stylus with a contact portion at a tip end thereof to be abutted to a workpiece, a stylus holder for supporting the stylus, a vibrator for resonating the stylus in an axial direction at frequency f1, and a detector for detecting change in vibration of the stylus by the vibrator.

2. Description of the Related Art

A height gauge (one-dimensional measuring machine), a coordinates measuring machine, and a profile measuring machine are known as measuring machines for measuring the configuration and/or dimensions of a workpiece. Various probes are used by the measuring machines in order to detect positional relation between the measuring machine and the workpiece. The probes are classified into non-contact-type probes and contact-type probes, and continuously measuring probes and trigger transmission probes.

A contact-type vibrating probe disclosed in Japanese Patent Laid-Open Publication No. Hei6-221806 is known as a contact-type trigger transmission probe (touch trigger probe) used for a coordinates measuring machine.

The contact-type vibrating probe disclosed in the publication includes a stylus having a contact portion to be in contact at a tip end thereof with a workpiece, a stylus holder for supporting the stylus, a vibrator for resonating the stylus in an axial direction thereof by applying ultrasonic vibration, and a detector for detecting a change in the stylus' vibration caused by the vibrator.

With the contact-type vibrating probe, since the vibration status of the stylus changes by touching the tip end, the end surface position of the workpiece can be detected by detecting the change in vibration status.

On the other hand, a contact-type vibrating probe is sometimes used for measuring the diameter of a small hole.

For measuring small holes, another contact-type probe shown in Japanese Patent Application No. Hei10-22047 has been proposed as a small size contact-type vibrating probe.

As shown in FIG. 24, the contact-type vibrating probe 100 includes a stylus holder 101, a stylus 102, a vibrator 103A and a detector 103B. A contact portion 102A to be in contact with the workpiece is provided at an end of the stylus 102 and a counterbalance 102B is provided at a base end of the stylus 102, so that the axially central position of the stylus 102 becomes the centroid position. When the stylus 102 vibrates in an axial direction, the centroid position becomes a node of vibration.

In the contact-type vibrating probe 100, the stylus 102 is composed of a thin stick member and the contact portion 102A is composed of a small sphere for adaptation to the small hole measurement. Further, since the thin stylus 102 is difficult to support at one point, the stylus holder 101 supports the stylus 102 at two points sandwiching the centroid position of the stylus 102.

The vibrator 103A and the detector 103B are made by dividing a piezoelectric element 103 stretching over the two supporting portions of the stylus holder 101. When the stylus 102 is resonated along the axial direction by the vibrator 103A, the nodes of vibration are generated at the centroid position of the stylus 102 and the supporting portions of the stylus 102 of the stylus holder 101.

According to the contact-type vibrating probe 100, since the stylus holder 101 supports the stylus 102 at the two portions sandwiching the nodes of vibration, the stylus 102 can be supported by the stylus holder 101 even when the stylus 102 is made by an extremely thin stick member, thus enabling the inner face measurement of a small hole having a large aspect ratio.

However, the following disadvantage occurs in continuous measurement along an inside wall of a small hole by the above-described contact-type vibrating probe 100.

Since the stylus 102 of the contact-type vibrating probe 100 has only a small axis diameter, the axis rigidity of the stylus 102 is lessened, so that the stylus 102 bends when the contact portion 102A is in contact with the workpiece, thus causing the so-called "adhesion phenomenon".

The adhesion phenomenon causes little problem in detecting contact between the contact portion 102A and the workpiece. However, when continuous contact measurement is conducted along an end surface of the workpiece, a mechanical phase delay can be generated, thus resulting in mechanical deformation by the adhesive force causing a position error.

Further, the following problem also occurs. The above-described contact-type vibrating probe can detect contact with the workpiece with high accuracy since the detection signal sensitively changes by applying an extremely small contact force. On the other hand, it is impossible for the contact-type vibrating probe to discriminate which longitudinal position (a point on the contact portion surface defined as an angle on a plane orthogonal with the axis of the stylus) of the spherical contact portion touches the end surface of the workpiece. Accordingly, the contact-type vibrating probe has no sensitivity difference with regard to longitudinal direction of the spherical contact portion, so that it is impossible to know in which direction the contact portion touches the end surface of the workpiece. Accordingly, the contact-type vibrating probe is not suitably used as a probe for profiling measurement and continuous measurement.

SUMMARY OF THE INVENTION

An object of the present invention is to provide a movement control mechanism for a contact-type vibrating probe capable of preventing the adhesion phenomenon of the stylus caused by the contact with the workpiece and for conducting continuous measurement along the surface of the workpiece.

For attaining the above object, a movement control mechanism for controlling movement of a contact-type vibrating probe according to the present invention comprises a contact-type vibrating probe having a stylus provided with a contact portion at a tip end thereof to be in contact with a workpiece, a stylus holder for supporting the stylus, a vibrator for resonating the stylus at frequency f1 in an axial direction, and a detector for detecting a change in vibration of the stylus by the vibrator. The movement control mechanism is characterized in having:

a support body mechanically connected to the stylus holder to move in three-dimensional space at a predetermined velocity in accordance with an external command;

a second vibrator for vibrating the stylus relative to the workpiece at a frequency f2 in a direction orthogonal to the axial direction of the stylus and also in a normal direction to a surface of the workpiece; and a controller for controlling movement of the support body so that the state of a detection signal detected by the detector at contact of the contact portion with the surface of the workpiece remains constant when the contact portion touches the surface of the workpiece while vibrating the stylus by the second vibrator.

According to the above movement control mechanism of the contact-type vibrating probe, the contact-type vibrating probe can be used for continuous measurement of a surface of the workpiece while avoiding the adhesion phenomenon. As shown in FIG. 1(b), when the contact portion 102A of the stylus 102 is disposed adjacent to the surface of the workpiece W and is vibrated at a frequency f2 in a normal line direction to the surface of the workpiece by the second vibrator, the contact portion 102A touches and separates from the end surface of the workpiece W, thus conducting a tapping action.

At this time, since the vibration of the stylus 102 is either free in a non-contact state or is restricted by contact force F in a contact state, the vibration of the stylus 102 in the axial direction at the frequency f1 decreases amplitude A of the vibration in the axial direction of the stylus 102 in accordance with increase in the contact force F as shown in FIG. 2. A detection signal $\overline{V}$ representing change (amplitude of the vibration, for instance) in the vibration detected by the detector takes turning value Va in accordance with vibration cycle (1/f2) of frequency f2 by the second vibrator, as shown in FIG. 3. When the stylus 102 moves in the B direction along the end surface of the workpiece W as shown in FIG. 4, the detection signal $\overline{V}$ takes turning value of Va as shown in FIG. 3 and the turning value Va is constant for every vibration cycle.

On the other hand, when the moving direction of the stylus 102 is slanted relative to the end surface of the workpiece W as shown in FIG. 5, the detection signal $\overline{V}$ is changed by the tapping action because the contact force of the contact portion 102A increases as the contact portion 102A gradually approaches toward the surface of the workpiece W and the turning value Va changes as shown in FIG. 6. Accordingly, by controlling the movement of the contact-type vibrating probe 100 by the controller so that the change in state represented by the turning value Va is constant (in other words, so that the detection signal $\overline{V}$ takes predetermined turning value Va and the turning value Va is constant), the contact-type vibrating probe 100 can move along the surface of the workpiece W to conduct continuous measurement of the surface of the workpiece W. Further, by setting the turning value Va so as not to exceed a predetermined value, the mechanical phase delay can be set extremely low, thus preventing error in the detection position in accordance with the adhesion phenomenon to conduct the continuous measurement of the end surface of the workpiece.

Specifically, as shown in FIG. 7, the movement control is conducted so that the stylus 102 moves toward and away in a direction C along the vibration by the second vibrator orthogonal with the axial direction of the stylus. By repeating the movement in the direction B and the direction C, the stylus 102 can move along the surface of the workpiece W.

In the present invention, the controller may preferably move the support body in a direction orthogonal with the line of normal to the end surface of the workpiece.

Specifically, the controller may preferably control the driving mechanism for moving the support body along the X-axis and the Y-axis directions of an XY positioning table for the workpiece and along the Z-axis direction normal to the XY table surface.

By employing the above controller, when the inside wall of a small hole W1 formed on the workpiece W is measured as shown in FIG. 8, the contact portion 102A can move along the inner circumference direction H of the small hole, thus conducting continuous measurement of the opening of the small hole W1. Further, as shown in FIG. 8, since the contact portion 102A can move in depth direction D of the small hole W1, continuous measurement of the small hole W1 in depth direction is possible.

Another object of the present invention is to provide a movement control mechanism of a contact-type vibrating probe which can employ the above contact-type vibrating probe as a probe for profiling measurement and continuous measurement and the configuration of the workpiece can be measured with high accuracy.

For attaining an object of the present invention, a movement control mechanism for controlling movement of a contact-type vibrating probe comprises a contact-type vibrating probe having a stylus provided with a contact portion to be in contact at a tip end thereof with a workpiece, a stylus holder for supporting the stylus, a vibrator for resonating the stylus at frequency f1 in an axial direction, and a detector for detecting a change in vibration of the stylus by the vibrator. The movement control mechanism is characterized in having:

a support body mechanically connected to the stylus holder to move in three-dimensional space at a predetermined velocity and direction in accordance with an external command;

a second vibrator for vibrating the stylus relative to the workpiece at a frequency f2 along a surface of the workpiece; and a controller for controlling movement of the support body or the workpiece so that the state of a detection signal detected by the detector at contact of the contact portion with the surface of the workpiece remains constant when the contact portion touches the surface of the workpiece while vibrating the stylus by the second vibrator.

According to the operating control mechanism of a contact-type vibrating probe, the contact-type vibrating probe can be used for profile measurement and continuous measurement while detecting the longitudinal position of the contact portion in contact with the workpiece as follows:

As shown in FIG. 1(b), the contact portion 102A of the stylus 102 is brought into contact with the end surface of the workpiece W and the amplitude A of axial vibration of the stylus 102 is detected as a detection signal detected by the detector. The amplitude A is the largest when the contact portion 102A is not in contact with the surface of the workpiece W. When the contact portion 102A is pressed onto the surface of the workpiece W to increase the contact force F, the amplitude A decreases. The value of the amplitude A of the contact force which can maintain the contact with the workpiece W and the contact portion 102A and does not cause damage on the stylus 102 is set as the predetermined value (threshold value) A0 as seen in FIG. 2.

The stylus 102 is vibrated by the second vibrator at the frequency f2 while the contact portion 102A is in contact with the surface of the workpiece W at a predetermined contact force so that the detection signal takes the threshold value A0.

When the vibrating direction caused by the second vibrator at frequency f2 is along the surface of the workpiece W as shown in FIG. 9, the amplitude A as the detection signal detected by the detector takes constant value A0 smaller than the amplitude G2 representing the amplitude during free vibration of the stylus 102 as shown in FIG. 10. There is no change in the condition shown in FIG. 10 after moving the stylus 102 along a vibrating direction M1 by the second vibrator.

On the other hand, when the vibrating direction M1 of the vibration by the second vibrator at frequency f2 is slightly slanted relative to the surface of the workpiece W as shown in FIG. 11, the contact force of the contact portion 102A relative to the surface of the workpiece W changes by the vibration of the second vibrator, and the amplitude A detected by the detector also changes in accordance therewith. This is because the contact force changes because the contact longitudinal position on the contact portion 102A before vibration by the second vibrator is different from the contact longitudinal position during vibration, which causes change in the contact force.

Accordingly, when the stylus 102 is moved along the vibrating direction M1 of the second vibrator, the amplitude A detected by the detector decreases in a direction toward the surface of the workpiece W and increases in a direction away from the surface of the workpiece as shown in graph G3 of FIG. 12.

In the present invention, when the amplitude A detected by the detector changes while the stylus and the workpiece are relatively vibrated along the surface of the workpiece by the second vibrator, the controller controls the movement of the contact-type vibrating probe and/or the workpiece so that the amplitude A as the detection signal is constant, so that the contact-type vibrating probe can move in a direction M2 along the end surface of the workpiece W to conduct continuous measurement of the surface of the workpiece W at a constant contact force.

In the present invention, since the above second vibrator is for vibrating the stylus at the frequency f2 along the surface of the workpiece and the workpiece has a three-dimensional configuration, the second vibrator preferably vibrates in three-dimensional directions. Specifically, with reference to a space coordinate system represented by an X-axis, a Y-axis, and a Z-axis, the second vibrator may preferably include an X-axis vibrating mechanism for vibrating the stylus in the X-axis direction, a Y-axis vibrating mechanism for vibrating the stylus in the Y-axis direction, and a Z-axis vibrating mechanism for vibrating the stylus in the Z-axis direction.

By arranging the second vibrator in the above-described manner, the vibrating direction of the second vibrator can be controlled three-dimensionally, thus conducting profiling measurement and continuous measurement of a workpiece having complicated three-dimensional configuration. When the inside wall is measured along the circumferential direction of a cylindrical workpiece, only the X-axis vibrating mechanism and the Y-axis vibrating mechanism are required for the second vibrator and the Z-axis vibrating mechanism is not necessary. In short, the arrangement of the second vibrator can be determined in accordance with intricacy of the configuration of the workpiece.

In the movement control mechanism of a contact-type vibrating probe, the controller may preferably control the movement of the support body or the workpiece so that the change in state quantity of the detection signal in accordance with the contact of the contact portion with the surface of the workpiece is minimized when the contact portion is in contact with the end surface of the workpiece while vibrating the stylus by the second vibrator.

Specifically, the controller may be arranged to drive a driving mechanism for relatively moving the support body in the X- and Y-axis directions of the XY table for the workpiece put on and the Z-axis direction normal to the XY table surface, to obtain the state quantity of the detection signal from the detector and to control the movement of the respective driving mechanism to minimize the state quantity, thus moving the support body and/or the workpiece relative to the surface of the workpiece.

According to the above controller, since the movement of the support body and/or the workpiece is controlled while obtaining the detection signal detected by the detector, the contact portion 102A can move along the end surface of the workpiece W, thus conducting profiling measurement of the workpiece with a minimum contact force.

Further, the movement control mechanism of a contact-type vibrating probe may preferably further include a vibrating direction controller for controlling vibrating direction of the second vibrator so that, when the contact portion touches the surface of the workpiece and the stylus and the workpiece are relatively vibrated by the second vibrator, the change in state of the detection signal including a predetermined value is minimized for the detection signal from the detector to take a predetermined value.

With the above-described vibrating direction controller, the vibrating direction of the vibration by the second vibrating direction can be changed to a direction relative to the surface of the workpiece in accordance with the change in the detection signal. Accordingly, since the vibrating direction of the contact portion to be in contact with the workpiece by the frequency f2 can be always maintained toward the surface of the workpiece, the profiling measurement and continuous measurement of the workpiece are possible without knowing the approximate configuration of the workpiece in advance.

In the present invention, following specific arrangement may preferably be used. The movement control mechanism may preferably further include an escape circuit for suspending the movement control by the controller when the change in the state of the detection signal cannot be maintained at a constant level and for moving the support body so that the contact portion is not in contact with the surface of the workpiece.

When a configuration of a bottom of a hole or a workpiece having a wall in advance of the stylus is to be measured, the workpiece and/or the contact-type vibrating probe can be damaged when the stylus continues to be moved by the controller even when the contact portion reaches the wall.

On the other hand, when the movement control mechanism of the contact-type vibrating probe has the above-described escape circuit, the movement control by the control circuit can be stopped and the support body can be moved so that the contact portion is not in contact with the surface of the workpiece, and the workpiece and/or the contact-type vibrating probe can be prevented from being damaged. Specifically, the support body and/or the workpiece may be moved, for instance, in a direction opposite to the relative moving direction of the stylus by the controller.

In the present invention, the vibrator and the second vibrator may include more than one vibration element disposed around the axis of the stylus at a predetermined angle, for instance, 90 degrees. Alternatively, the first vibrator and the second vibrator may include more than two vibration elements disposed around the axis of the stylus at an equal interval.

The above-described vibration element may be piezoelectric element. The first vibrator and the second vibrator can be constituted by disposing the piezoelectric elements on a surface of a cylindrical body for a stick-shaped stylus to be inserted, where two piezoelectric elements are arranged on the cylinder surface at 90 degrees relative to each other, or three piezoelectric elements may be arranged on the cylinder surface spaced at 120 degrees at an equal interval.

By synchronously an electric signal applying of frequency f1 to the respective piezoelectric elements, since the force of the piezoelectric elements in the axial direction is not cancelled, the stylus can be resonated in the axial direction.

On the other hand, when the frequency f2 is applied to the plurality of piezoelectric elements provided around the axis in 90 degrees or at equal intervals, since the force of the stylus in the flexural direction is combined and applied to the stylus, the piezoelectric elements are capable of setting the vibration surface of the vibration by the second vibrator in any desired direction around the stylus.

In the present invention, the above-described second vibrator may be provided as a body independent of the vibrator, thus vibrating the stylus holder in two directions mutually orthogonal with each other relative to the axis line of the stylus.

Specifically, the second vibrator may have a serial disposition of a vibration element for vibrating the stylus holder in one direction and another vibration element for vibrating the stylus holder in the other direction.

Alternatively, the second vibrator may have a parallel disposition of a vibrator for vibrating the stylus holder in one direction and another vibrator for vibrating the stylus holder in the other direction.

Since such second vibrator is provided as a body independent of the first vibrator, the present invention can be implemented using the contact-type vibrating probe having a conventional vibrator, and only the stylus can be easily exchanged while leaving the second vibrator as it is.

BRIEF DESCRIPTION OF THE DRAWINGS

FIG. 15 is a schematic view showing the measurement process in the first embodiment;

FIG. 20 is a summarized perspective view showing a structure of the contact-type vibrating probe of a movement control mechanism of the contact-type vibrating probe according to the fourth embodiment of the present invention;

FIG. 21 is a summarized perspective view showing a structure of a stylus and vibrator in the fourth embodiment;

DETAILED DESCRIPTION OF THE PREFERRED EMBODIMENT(S)

Figure 1:
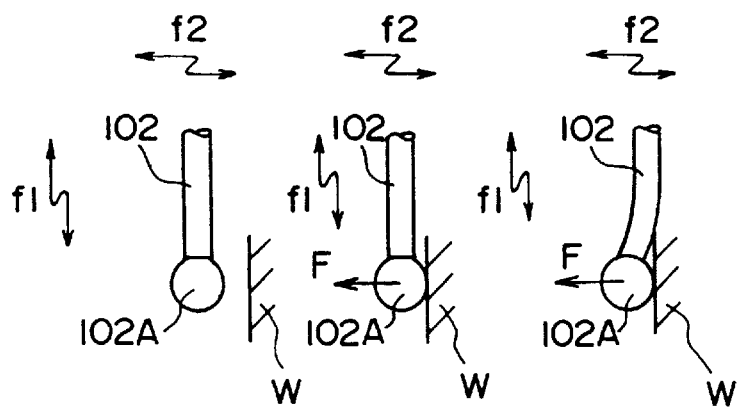
FIGS. 1(a), (b), and (c) are schematic views for illustrating one operation mode of the present invention.

Preferred embodiments of the present invention will be described below with reference to the attached drawings. The same reference numerals will be attached to portions or members identical with or similar to the above-described components, thus omitting or simplifying description therefor.

[First Embodiment]

Figure 13:
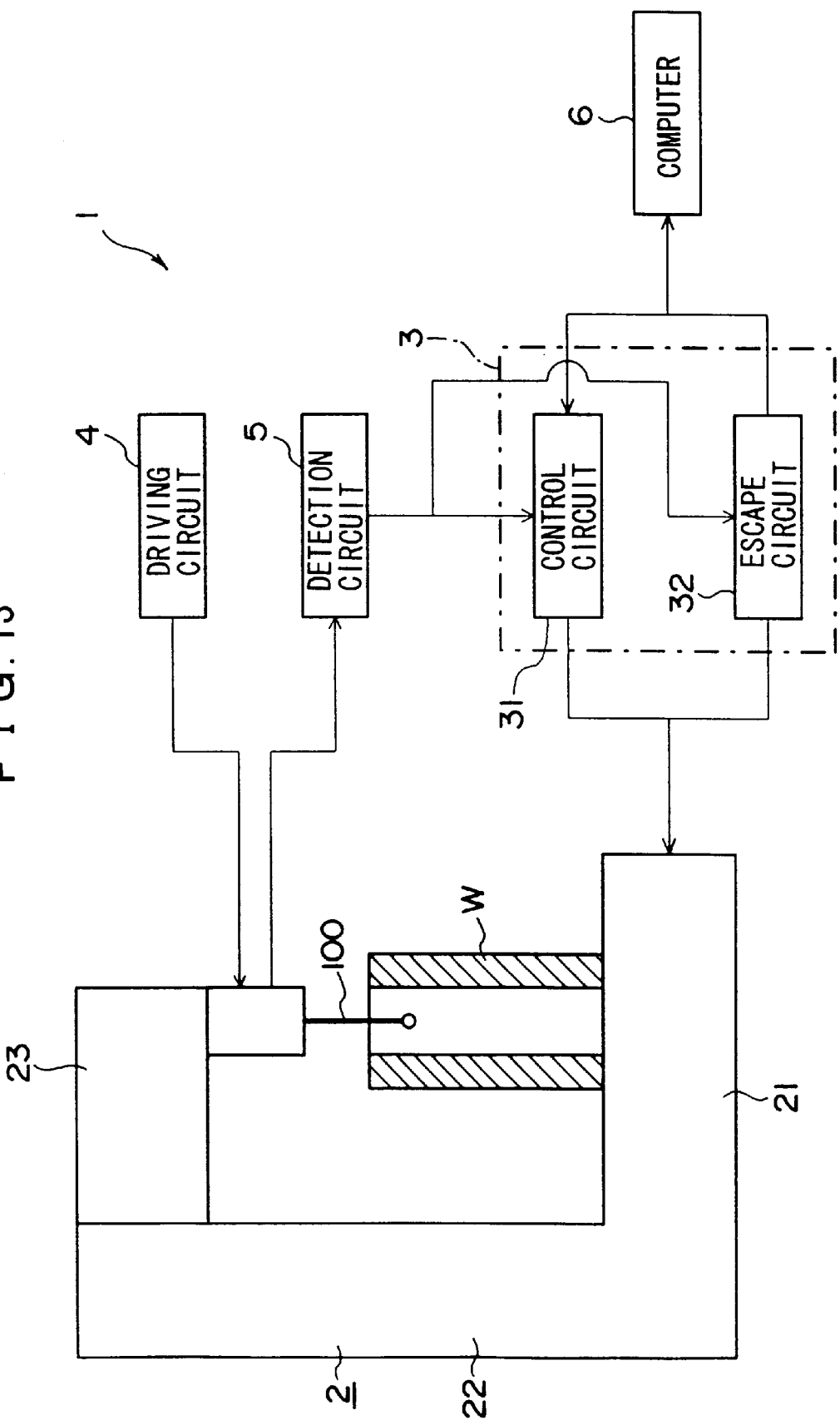
FIG. 13 is a schematic diagram showing a movement control mechanism of the contact-type vibrating probe according to the first embodiment of the present invention.

FIG. 13 shows an inside-outside measuring machine installed with a movement control mechanism of the contact-type vibrating probe according to the first embodiment of the present invention.

The inside-outside measuring machine 1 includes a measuring machine body 2, a controller 3, a driving circuit 4, a detection circuit 5 and a computer 6. The driving circuit 4 vibrates the contact-type vibrating probe 100 in the axial direction of the stylus and in a direction orthogonal with the axis. The detection circuit 5 processes the electric signal from the detector provided to the stylus to output to the controller 3. The computer 6 outputs a control signal to the controller 3 to control movement of the measuring machine body 2, and the detection signal from the detection circuit 5 is inputted to the computer 6 through the controller 3, so that the detection signal is arithmetically processed to evaluate roundness or shape of a workpiece W.

The workpiece W is put on the measuring machine body 2 to measure surface configuration thereof. The measuring machine body 2 includes an XYZ table 21 for the workpiece to be put on, a column 22 disposed on an end portion of the XYZ table 21, a support body 23 slidable in a direction extending from the column 22, and the contact-type vibrating probe 100 supported by the support body 23.

Though not shown in FIG. 13, in order to place the workpiece W at a predetermined position, the XYZ table 21 has an X-axis adjusting mechanism and a Y-axis adjusting mechanism for moving the workpiece W along the surface of the XYZ table 21, and a Z-axis adjusting mechanism for moving the workpiece W in a normal direction of the surface of the XYZ table 21. After the workpiece W is put on the XYZ table 21, the axis adjust mechanisms are operated to accurately adjusting the position of the workpiece.

Further, though not shown in FIG. 13, the support body 23 has an X-axis driving mechanism and a Y-axis driving mechanism for moving the contact-type vibrating probe 100 along the surface of the XYZ table 21, and a Z-axis driving mechanism for elevating the support body 23 along the column 22, the movement of the axis driving mechanisms being controlled by the below-described controller 3.

The controller 3 controls the movement of the support body 23, which includes a control circuit 31 and an escape circuit 32.

Figure 3:
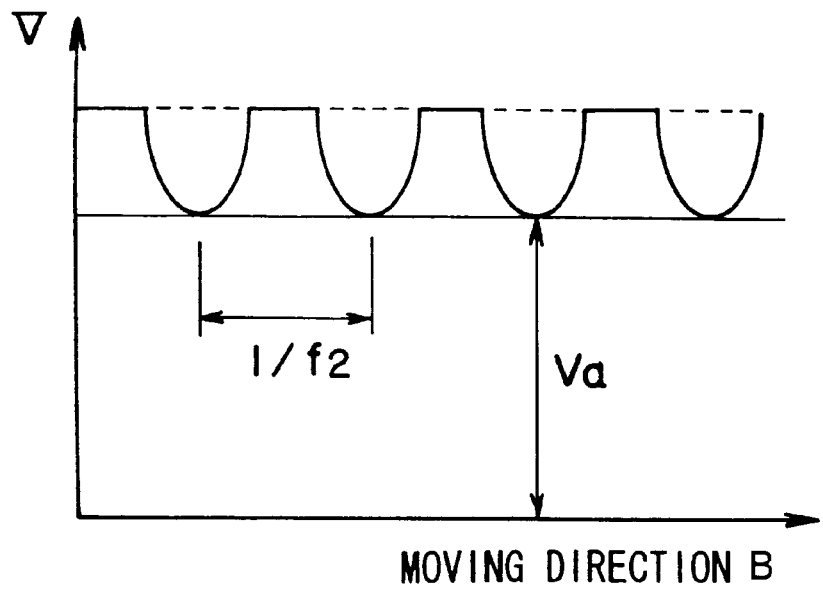
FIG. 3 is a graph showing change in detection signal for illustrating the first mode of the present invention.
Figure 4:
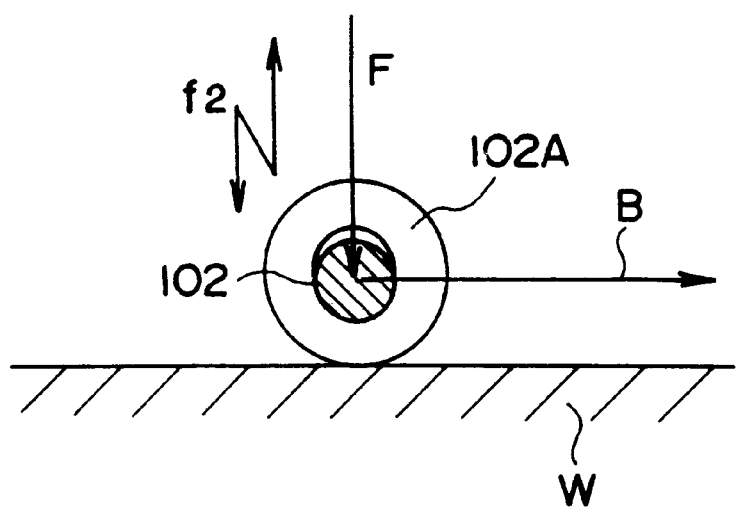
FIG. 4 is a schematic view showing the moving direction of a stylus and disposition of an end surface of a workpiece for illustrating the first mode of the present invention.
Figure 5:
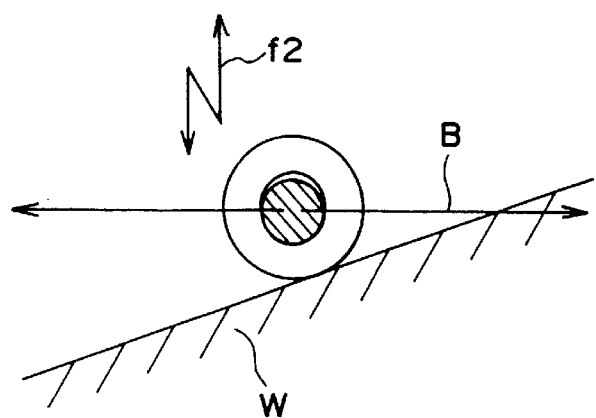
FIG. 5 is a schematic view showing the moving direction of a stylus and disposition of an end surface of a workpiece for illustrating the present invention.

The control circuit 31 controls the movement of the support body 23 of the measuring machine body 2 based on a measurement initiation signal from the computer 6 and controls the movement of the support body 23 so that detection signal $\overline{V}$ from the detection circuit 5 has a turning value Va and the turning value Va becomes constant (see FIG. 3). More specifically, the control circuit 31 controls the movement of the support body 23 so that the stylus 102 moves in a direction toward the end face of the workpiece W.

The escape circuit 32 stops operation by the control circuit 31 and outputs a control signal to move the support body 23 in a direction opposite to the moving direction of the contact-type vibrating probe 100 by the control circuit 31 when the detection signal $\overline{V}$ from the detection circuit 5 cannot maintain the predetermined turning value Va. The escape circuit 32 makes the contact-type vibrating probe 100 cease contact with the workpiece W, thus preventing damage caused by excessive contact force.

Figure 14:
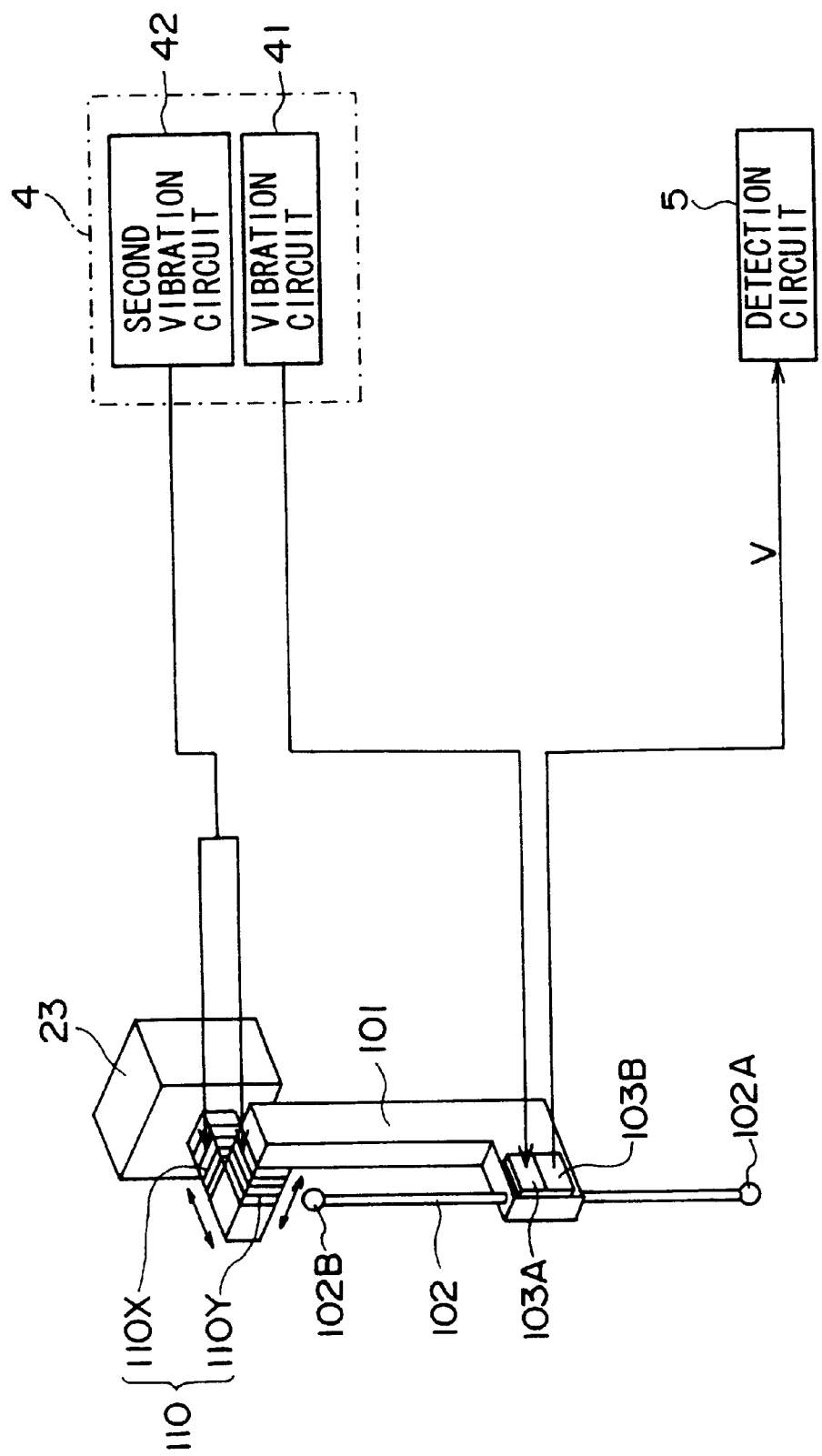
FIG. 14 is a schematic view showing a structure of the contact-type vibrating probe according to the first embodiment.

As shown in FIG. 14, the contact-type vibrating probe 100 has the stylus holder 101, the stylus 102, the contact portion 102A, the counterbalance 102B, the vibrator 103A, and the detector 103B. Second vibrator 110 for vibrating the stylus 102 in a direction orthogonal with the axis of the stylus 102 is provided between the support body 23 and the stylus holder 101 supported by the support body 23. The second vibrator 110 has an X-axis vibration element 110X and a Y-axis vibration element 110Y vibrating in mutually orthogonal directions for vibrating the stylus 102 on a plane orthogonal with the axis of the stylus 102 in a desired direction. The X-axis vibration element 110X and the Y-axis vibration element 110Y are serially disposed between the stylus holder 101 and the support body 23.

The driving circuit 4 applies an electric signal of a predetermined frequency (ultrasonic range, for instance) to the vibrator 103A and the second vibrator 110, which is composed of a vibration circuit 41 and second vibration circuit 42.

The vibration circuit 41 has an oscillator for generating an electric signal to operate the vibrator 103A at a predetermined amplitude and frequency, thus vibrating the stylus 102 at a frequency f1 in the axial direction.

The second vibration circuit 42 includes an oscillator for generating an electric signal to operate the above-described X-axis vibration element 110X and the Y-axis vibration element 110Y at a predetermined amplitude and frequency. Though the oscillator synchronously operates the X-axis vibration element 110X and the Y-axis vibration element 110Y, the amplitude of the electric signal of respective vibration elements 110X and 110Y can be independently adjusted. By applying electric signals having different amplitudes to the respective vibration elements 110X and 110Y, the stylus 102 vibrates in any desired direction, thus synchronizing the vibration of the vibration elements 110X and 110Y. In other words, the vibration frequency of both of the vibration elements 110X and 110Y coincide with each other to control phases thereof. Accordingly, the stylus 102 vibrates in any direction on a plane orthogonal with the axis of the stylus 102 at frequency f2.

Next, the operation of the inside-outside measuring machine 1 of the above-described first embodiment will be described below with reference to inside wall measurement of small hole W1 as shown in FIG. 15.

(1) As shown in FIG. 15, the central coordinate of the inner diameter center O of the small hole W1 is measured in advance by three-point method, etc., and approximate radius R is obtained.

(2) Considering amplitude of the stylus 102 by the second vibrator 110, circle S1 being smaller than the radius R by Δr is set in the controlling circuit 31 as a fundamental movement locus of the contact portion 102A. More specifically, the movement of the contact portion 102A is controlled based on an angle θ from a measurement initiation point P0 in FIG. 15 and radius R-Δr. Incidentally, since amplitude of the vibration orthogonal with the axis of the stylus 102 by the second vibrator 110 is extremely small, the Δr may practically be regarded as a value approximately the same as the radius of the contact portion 102A.

(3) The electric signal of the second vibration circuit 42 is set as a function of the angle θ so that the stylus 102 vibrates along the normal line of the inside wall of the small hole W1 by the second vibrator 110, and the X-axis vibration element 110X and the Y-axis vibration element 110Y constituting the second vibrator 110 are actuated. More specifically, when the X-axis vibration element 110X is vibrated in a direction extending from the center O of the circle S1 to the measurement initiation point P0, when maximum force of the X-axis vibration element 110X and the Y-axis vibration element 110Y in a direction orthogonal with the axis of the stylus 102 is defined as F, and when the frequency by the second vibration circuit 42 is f2, the force Fx in the X-axis direction by the X-axis vibration element 110X and the force Fy in the Y-axis direction by the Y-axis vibration element 110Y can be set as the following functions wherein t represents time.

$$Fx=F^*\sin(2\pi^*f2^*t)^*\cos\theta$$

$$Fy=F^*\sin(2\pi^*f2^*t)^*\sin\theta$$

Accordingly, the contact portion 102A taps the inside wall of the small hole W1 at a predetermined frequency (1/f2).

(4) While the stylus 102 is vibrated in the axial direction by the vibrator 103B and the contact portion 102A taps the inside wall of the small hole W1, scanning of the inside wall of the small hole W1 is initiated by the control circuit 31.

Figure 6:
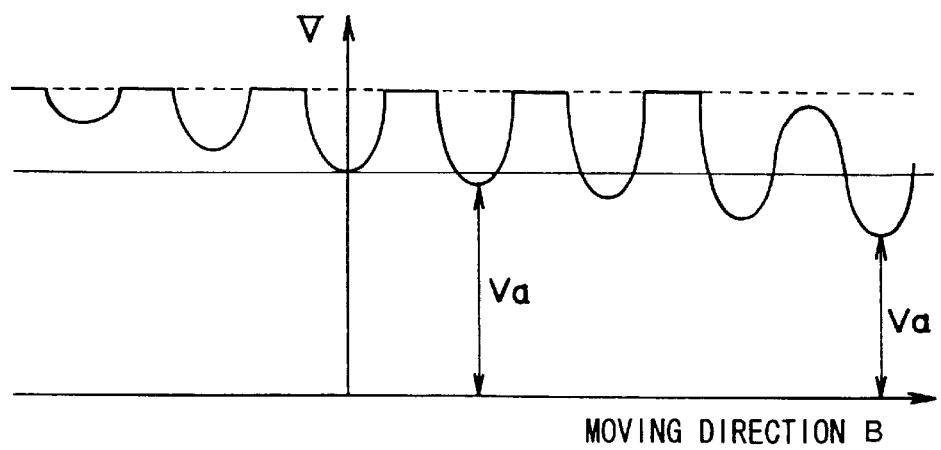
FIG. 6 is a graph showing a change in detection signal for illustrating the present invention.
Figure 7:
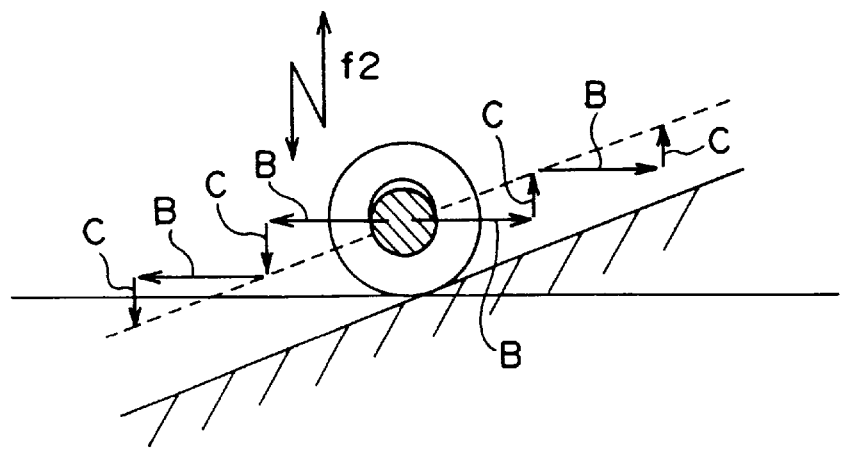
FIG. 7 is a schematic view showing movement control of the contact-type vibrating probe by the movement control mechanism of the contact-type vibrating probe according to the present invention.
Figure 8:
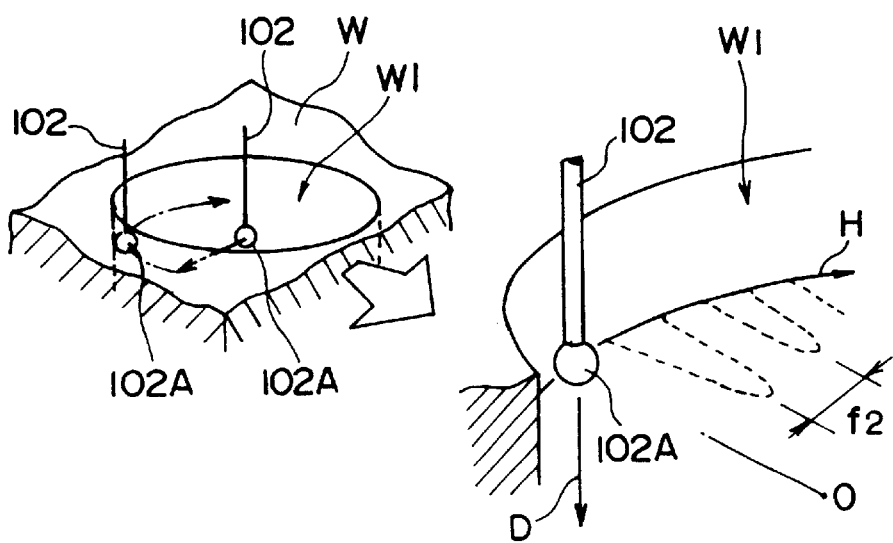
FIG. 8 is a schematic view showing the scanning direction of the contact-type vibrating probe by the movement control mechanism of the contact-type vibrating probe according to the present invention.
Figure 9:
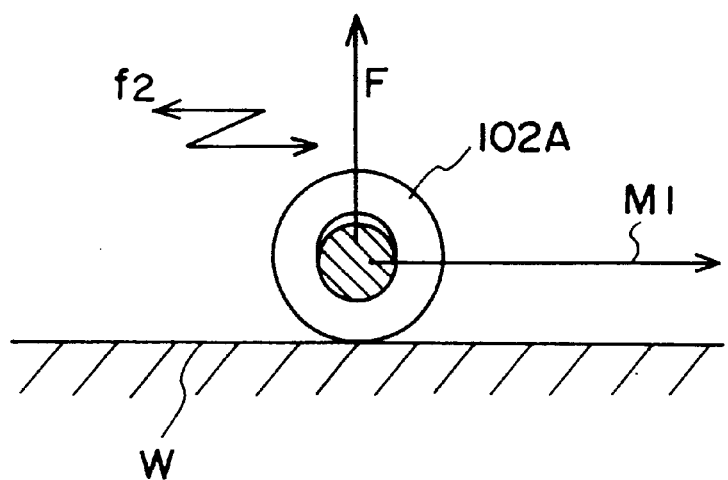
FIG. 9 is a schematic view for illustrating a second operation mode of the present invention.
Figure 10:
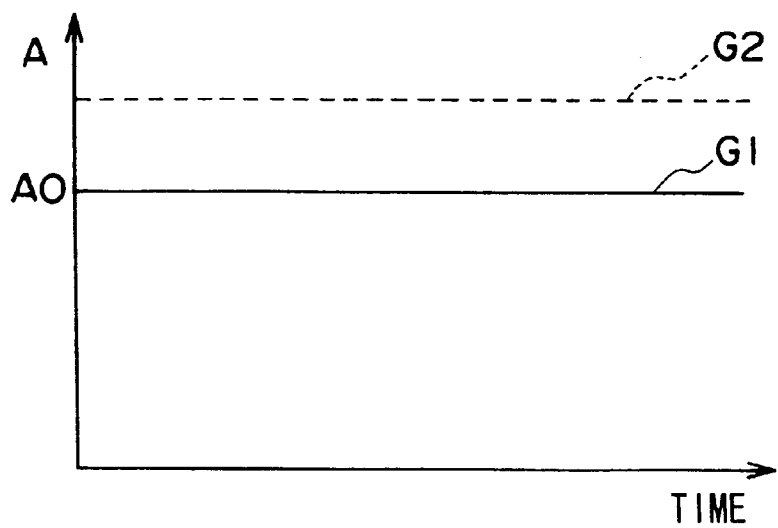
FIG. 10 is a graph for illustrating the second mode of the present invention.
Figure 11:
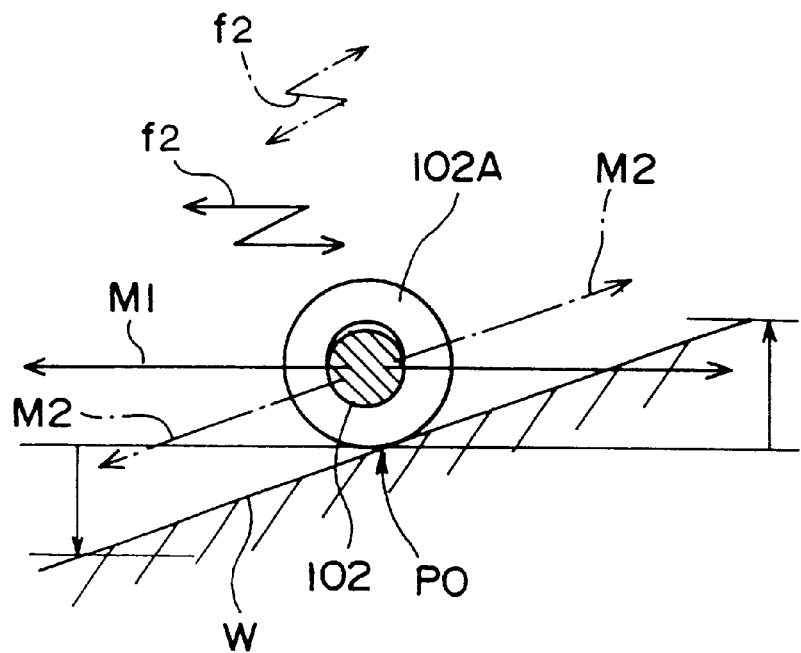
FIG. 11 is a schematic view for illustrating the second mode of the present invention.
Figure 12:
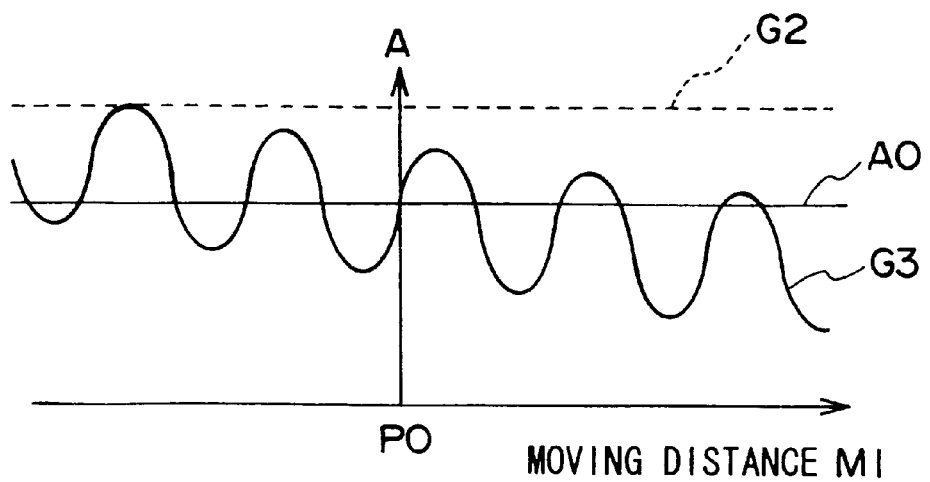
FIG. 12 is a graph for illustrating the second mode of the present invention.

(5) During the scanning process, when the turning value Va of the detection signal $\overline{V}$ of the detector 103B changes as shown in FIG. 6, in other words, inner circumference of the small hole W1 is shifted relative to the arc locus S1 set by the control circuit 31, the changing turning value Va is inputted to the control circuit 31 via the detection circuit 5. Then, the control circuit 31 controls the movement of the support body 23 to move the stylus 102 along the vibration surface by the second vibrator 110, thus returning the turning value Va to a predetermined level. Specifically, when the turning value Va decreases, the control circuit 31 controls the movement of the contact portion 102A to separate from the inside wall of the small hole W1 to the center O. On the other hand, when the turning value Va increases, the control circuit 31 controls the movement of the contact portion 102A so that the contact portion 102A approaches the inside wall of the small hole W1 from the center O.

(6) When the turning value Va of the detection signal from the detector 103B cannot be maintained within a predetermined value in spite of the operation by the control circuit 31, the controller 3 stops operation control of the support body 23 by the control circuit 31 and conduct escape operation by the escape circuit 32. Specifically, the escape circuit 32 moves the support body 23 in a direction opposite to the movement direction by the control circuit 31.

(7) On the other hand, when the measurement is conducted in a depth direction of the small hole W1, the control circuit 31 controls the support body 23 to move vertically. Incidentally, when the support body 23 is controlled to move downward and the contact portion 102A abuts the surface of the XYZ table 21, the detection signal $\overline{V}$ becomes smaller than the detection signal in non-contact state in the entire range. Accordingly, the support body 23 is lifted by the escape circuit 32.

According to the above-described first embodiment, the following effects can be obtained.

Since the contact portion 102A taps the inside wall of the small hole W1 as the workpiece and the control circuit 31 controls the movement of the support body 23 so that the detection signal $\overline{V}$ has a predetermined turning value Va, excessive flexural force can be prevented from being applied to the stylus 102, thus conducting measurement of the inside wall of the small hole W1 with extremely small mechanical phase delay. Accordingly, detection position error accompanied by adhesion phenomenon can be prevented during inside measurement of the small hole W1.

Further, since the control circuit 31 controls the driving mechanism for moving the support body 23 in the X, Y, Z-axis direction of the XYZ table 21, continuous measurement is possible even for a workpiece having three-dimensionally complicated inside wall such as the small hole W1. Further, since the control circuit 31 controls the support body 23 to move toward and away from the vibration surface of the vibration by the second vibrator 41 when the turning value Va of the detection signal $\overline{V}$ changes, the contact portion 102A can be always in contact with the inside wall of the small hole W1 at a constant contact force, thus performing continuous measurement of the contact-type vibrating probe 100 with high accuracy.

Further, since the movement control mechanism of the contact-type vibrating probe includes the escape circuit 32, the support body 23 can be moved in a direction opposite to the moving direction of the support body 23 by the control circuit 31 when the detection signal $\overline{V}$ from the detector 103B cannot maintain the predetermined turning value Va, thus preventing excessive contact force from being applied to the stylus 102 and damage of the contact-type vibrating probe 100, so that the contact-type vibrating probe 100 can be used for measuring a dead hole, etc. Further, since the second vibrator is provided as an independent body of the vibrator 103B, the contact-type vibrating probe having a known vibrator 103B can be used, thus implementing the present invention with a contact-type vibrating probe having various configurations and sizes.

[Second Embodiment]

Next, the second embodiment of the present invention will be described below. In the above-described movement control mechanism of the contact-type vibrating probe according to the first embodiment, the contact-type vibrating probe 100 has a vibrator 103A provided on the stylus holder 101 and the second vibrator 110 provided between the support body 23 and the stylus holder 101, both vibrators 110A and 103A being respectively driven by the independent vibration circuits 41 and 42.

On the other hand, the movement control mechanism of the contact-type vibrating probe according to the second embodiment differs in that the first vibrator and the second vibrator are integrally provided around the axis of the stylus constituting the contact-type vibrating probe.

Figure 16:
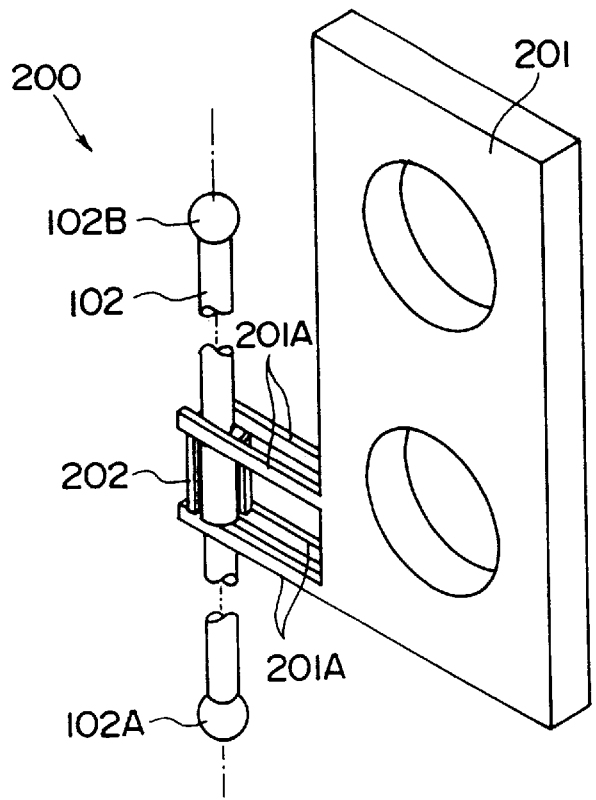
FIG. 16 is a summarized perspective view showing a structure of the contact-type vibrating probe of a movement control mechanism of the contact-type vibrating probe according to the second embodiment of the present invention.

In other words, as shown in FIG. 16, the contact-type vibrating probe 200 according to the second embodiment has a stylus holder 201 and a cylindrical body 202 sandwiched by two support pieces 201A for the stylus 102 to be inserted therein.

Figure 17:
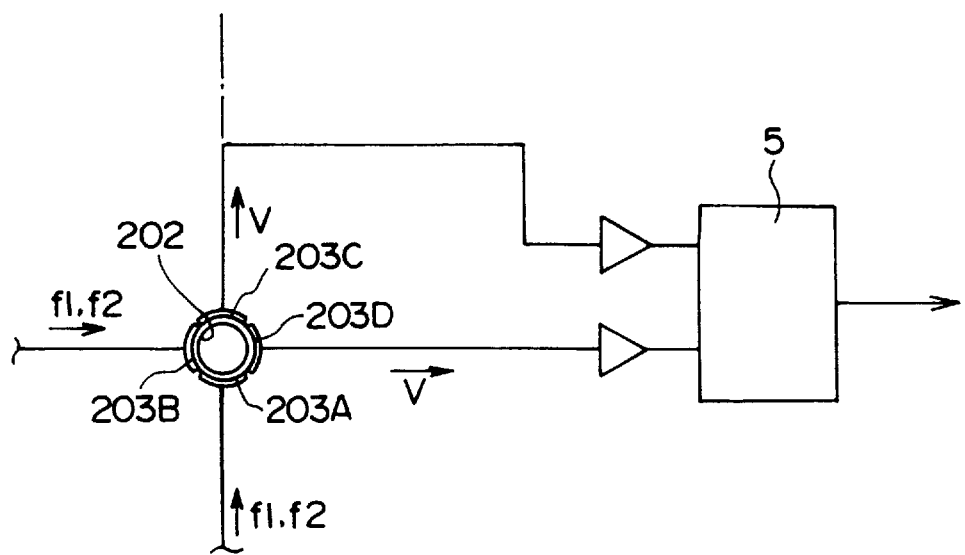
FIG. 17 is a schematic view showing a disposition of a vibrator and second vibrator in the second embodiment.

On an outer circumference of the cylindrical body 202, four piezoelectric elements 203A, 203B, 203C, and 203D are provided as shown in FIG. 17. Among the piezoelectric elements, two piezoelectric elements 203A and 203B disposed around the axis of the stylus 102 at a right angle are the vibration elements, respectively forming the first vibrator and the second vibrator.

The piezoelectric elements 203C and 203D opposing the piezoelectric elements 203A and 203B are made to be the detector. The detection signal $\overline{V}$ outputted by the respective piezoelectric elements 203C and 203D being processed by the detection circuit 5.

Incidentally, other parts of the contact-type vibrating probe 200 and the structure of the inner and outer side face measuring machine for the contact-type vibrating probe 200 are identical with the aforesaid first embodiment and the description thereof is omitted here.

Though not shown in FIG. 17, the piezoelectric elements 203A and 203B are driven by electric signals of two types of frequencies f1 and f2 by the vibration circuit. One is the natural frequency f1 of the stylus 102 in the axial direction and the other is flexural direction frequency f2 of the stylus 102.

Forces FA1 and FB1 for the piezoelectric elements 203A and 203B to be vibrated by the natural frequency f1 are synchronized with each other and the stylus 102 resonates in the axial direction because FA1 equals FB1.

On the other hand, forces FA2 and FB2 of the piezoelectric elements 203A and 203B orthogonal with the axis of the stylus 102 generated by the frequency f2 can be defined by the clockwise angle θ from the base point of measurement initiation point P0 on the circle S1 around the center O in view of FIG. 15, as follows.

$$FA2 = F^* \sin(2\pi^* f2^* t)^* \cos\theta$$

$$FB2 = F^* \sin(2\pi^* f2^* t)^* \sin\theta$$

When the inside wall of the small hole W1 shown in FIG. 15 is measured by the contact-type vibrating probe 200, the central position coordinate O and radius R of the inner diameter of the small hole are measured in the same manner as in the first embodiment. Subsequently, the contact-type vibrating probe 200 is moved in a direction where θ becomes 0 to be in contact with the inside wall of the small hole W1. The piezoelectric elements 203C and 203D as the detectors output resonance changes of natural frequency f1 on contact to the detection circuit 5, thus recognizing the position coordinate. By continuously repeating the process along the inside wall of the small hole W1, configuration of the inside wall of the small hole W1 can be grasped.

When the above contact-type vibrating probe 200 is attached to the support body, the direction where θ becomes 0 should be noted. Since the direction is structurally determined by the disposition of the piezoelectric elements 203A and 203B constituting the vibrator and the second vibrator, the position around the stylus 102 has to be uniquely determined when the contact-type vibrating probe 200 is attached to the support body.

According to the above-described second embodiment, the following effects can be obtained as well as the effects mentioned in the first embodiment.

Since the frequency f1 is synchronously applied to the piezoelectric elements 203A and 203B, the forces in the axial direction FA1 and FB1 of the piezoelectric elements 203A and 203B constituting the vibrator are not cancelled, so that stylus 102 can be resonated in the axial direction.

Further, since the piezoelectric elements 203A and 203B constituting the second vibrator are disposed around the axis of the stylus 102 at a right angle, the forces FA2 and FB2 of the respective piezoelectric elements 203A and 203B in flexural direction are combined and applied to the stylus 102, so that the vibration surface of the vibration of the stylus 102 by the second vibrator can be set at a desired direction around the axis of the stylus 102, thus continuously measuring the inside wall of the small hole W1.

Further, since the vibrator and the second vibrator are integrally provided on the cylindrical body 202, the size of the contact-type vibrating probe 200 can be reduced, so that the small hole having an extremely small diameter can be measured.

Since the second vibrator is not necessarily provided between the support body 23 and the stylus holder 101 in contrast to the first embodiment, the movement control mechanism of the contact-type vibrating probe according to the present invention can be used in various inner and outer side face measuring machines, thus remarkably improving applicability thereof

[Third Embodiment]

Next, the third embodiment of the present invention will be described below.

In the contact-type vibrating probe 200 according to the second embodiment, four piezoelectric elements 203A to 203D are integrally provided on the cylindrical body 202 disposed around the stylus 102 and the piezoelectric elements 203A and 203B disposed mutually at a right angle constitute the vibrator and the second vibrator.

Figure 18:
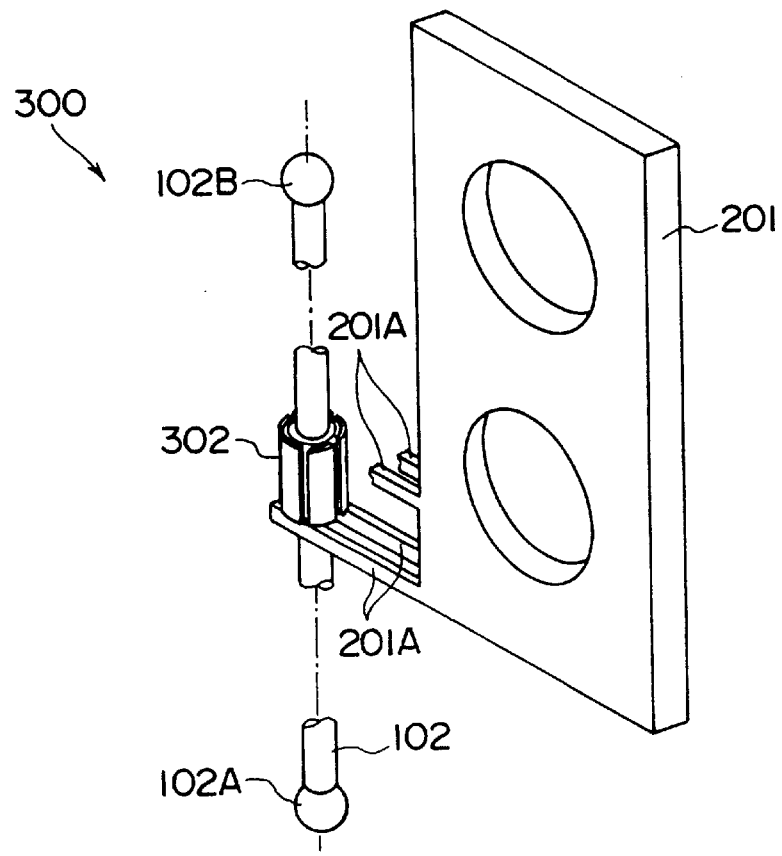
FIG. 18 is a summarized perspective view showing a structure of the contact-type vibrating probe of a movement control mechanism of the contact-type vibrating probe according to the third embodiment of the present embodiment.

As shown in FIG. 18, the contact-type vibrating probe 300 according to the third embodiment has the same arrangement such as the stylus holder 210, the stylus 102, the contact portion 102A as the contact-type vibrating probe 200 according to the second embodiment, but differs in that six piezoelectric elements are disposed at an equal interval on an outer circumference of cylindrical body 302 for the stylus 102 to be inserted therein.

Figure 19:
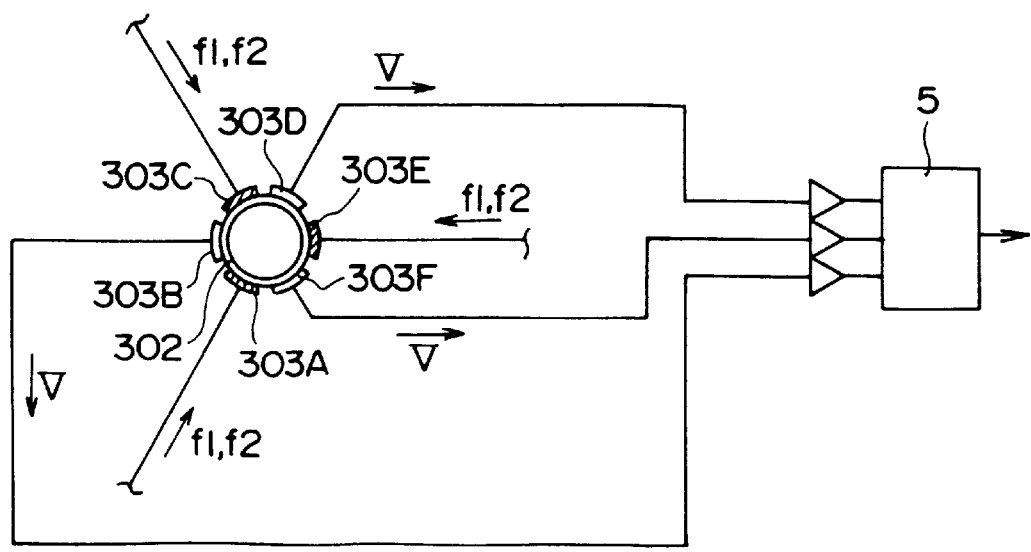
FIG. 19 is a summarized perspective view showing a disposition of a vibrator and a second vibrator in the third embodiment.

As shown in FIG. 19, piezoelectric elements 303A, 303B, 303C, 303D, 303E and 303F are provided on the outer circumference of the cylindrical body at an equal interval. Three piezoelectric elements 303A, 303C and 303E disposed at 120 degrees with a predetermined interval around the stylus 102 are vibration elements, which constitute the vibrator and the second vibrator. The piezoelectric elements 303B, 303D and 303F opposing the three piezoelectric elements 303A, 303C and 303E constitute the detector.

The three piezoelectric elements 303A, 303C and 303E constituting the vibrator and the second vibrator are synchronously applied with a signal of frequency f1 for vibrating the stylus 102 in an axial direction and are also applied with electric signal of frequency f2 for vibrating the stylus 102 in a direction orthogonal with the axis thereof Incidentally, the force orthogonal with the axis of the stylus 102 is defined as a resultant force of the forces generated by vibration of frequency f2 of the three piezoelectric elements 303A, 303C, and 303E.

According to the contact-type vibrating probe 300 of the third embodiment, the following effects can be obtained as well as the effects mentioned in the second embodiment.

Since piezoelectric elements 303A, 303C and 303E are disposed around the axis of the stylus 102 at 120 degrees with a predetermined interval, the stylus 102 can be vibrated in any desired direction orthogonal with the stylus 102 irrespective of the disposition of the piezoelectric elements 303A, 303C, and 303E.

Further, since the piezoelectric elements 303A, 303C, and 303E are disposed axially symmetrically, tapping action of the stylus 102 can be made even in any directions on the measurement surface.

Further, influence of unevenness of the piezoelectric elements' property can be decreased in the present arrangement.

[Fourth Embodiment]

Next, the fourth embodiment of the present invention will be described below.

The contact-type vibrating probe 200 according to the second embodiment has the cylindrical body 203 for the axis of the stylus 102 to be inserted, and the piezoelectric elements 203A and 203B provided on the outer circumference of the cylindrical body 203 work as the vibrator and the second vibrator.

In contrast thereto, as shown in FIG. 20 and FIG. 21, the contact-type vibrating probe 400 according to the fourth embodiment differs in having a plurality of piezoelectric elements 403A on the cylindrical body 402 for the axis of the stylus 102 to be inserted and a piezoelectric element 103A on the centroid position of the stylus 102, the piezoelectric element 403A being the second vibrator and the piezoelectric element 103A being the vibrator.

Specifically, as shown in FIG. 20, the contact-type vibrating probe 400 has the stylus 102, the contact portion 102A, the counterbalance 102B, the stylus holder 201, second stylus holder 401, the cylindrical body 402, and base 410 as the support body. A base end of the cylindrical body 402 is fixed to the base 410 and the second stylus holder 401 is attached to the tip end of the cylindrical body 402. The cylindrical body 402 is sandwiched by the base 410 and the second stylus holder 401.

The plurality of piezoelectric elements 403A is provided in parallel on the outer circumference of the cylindrical body 402, which constitutes the second vibrator. Incidentally, the plurality of piezoelectric elements 403A is provided on the outer circumference of the cylindrical body 403 by four to six, the piezoelectric elements being disposed mutually at an equal interval.

The second stylus holder 401 is a cylindrical body having a step portion at an intermediary of the side thereof. The cylindrical body 402 is fitted to the upper portion of the step portion having smaller outer diameter and the second stylus holder 401 has the slit 401A and fixing vis 401B formed on the cylindrical side of the stylus holder 401.

As shown in FIG. 21, the stylus 102 is supported by the stylus holder 201 at two points sandwiching the centroid position as the node of vibration in the axial direction. The stylus holder 201 is provided with the vibrator 103A and the detector 103B composed of the piezoelectric element.

The stylus holder 201 is inserted to the slit 401A of the second stylus holder 401 and is fixed to the second stylus holder 401 by the fixing vis 401B.

An electric signal of frequency f2 is applied from the second vibration circuit (not shown) to the piezoelectric element 403A constituting the second vibrator and the electric signal of frequency f1 is applied from the vibration circuit to the piezoelectric element 103A constituting the vibrator. Incidentally, the direction of the vibration surface of the vibration orthogonal with the axial direction of the stylus 102 is given as composite vector of the plurality of the piezoelectric element 403A as in the second embodiment, and description thereof is omitted here.

According to the contact-type vibrating probe 400 of the fourth embodiment, following effects can be obtained as well as the effect mentioned in the second embodiment.

Since the piezoelectric element 403A provided on the cylindrical body 402 does not require detection electrode, the number thereof can be made relatively small, thus simplifying the structure of the contact-type vibrating probe 400.

Since the piezoelectric element 103A for generating axial vibration of the stylus 102 and the piezoelectric element 403A for generating vibration in a direction orthogonal with the axis are provided independently, the tapping action of the stylus 102 does not exert influence on the axial vibration of the stylus 102, so that vibration having no disturbance can be obtained in the axial direction, thus measuring with high accuracy.

Further, for exchanging the stylus 102, since the second vibrator is not disposed integrally with the stylus 102, the stylus 102 can be exchanged while maintaining the piezoelectric element 403A as the second vibrator, thus reducing the production cost.

Since the piezoelectric element 403A on the cylindrical body 402 as the second vibrator and the piezoelectric element 103A as the vibrator are independently provided and the stylus 102 is fixed to the second stylus holder 401 by the fixing vis 401B, the conventional contact-type vibrating probe can be used, thus making exchange work of the stylus 102 easier.

[Fifth Embodiment]

Next, the fifth embodiment of the present invention will be described below.

The above-described first embodiment relates to the inside-outside measuring machine 1 for evaluating roundness, etc. of the workpiece W. In contrast thereto, the present embodiment relates to a profiling measuring machine 1A for processing the detection signal $\overline{V}$ and for obtaining the outer diameter configuration of the workpiece W.

Figure 22:
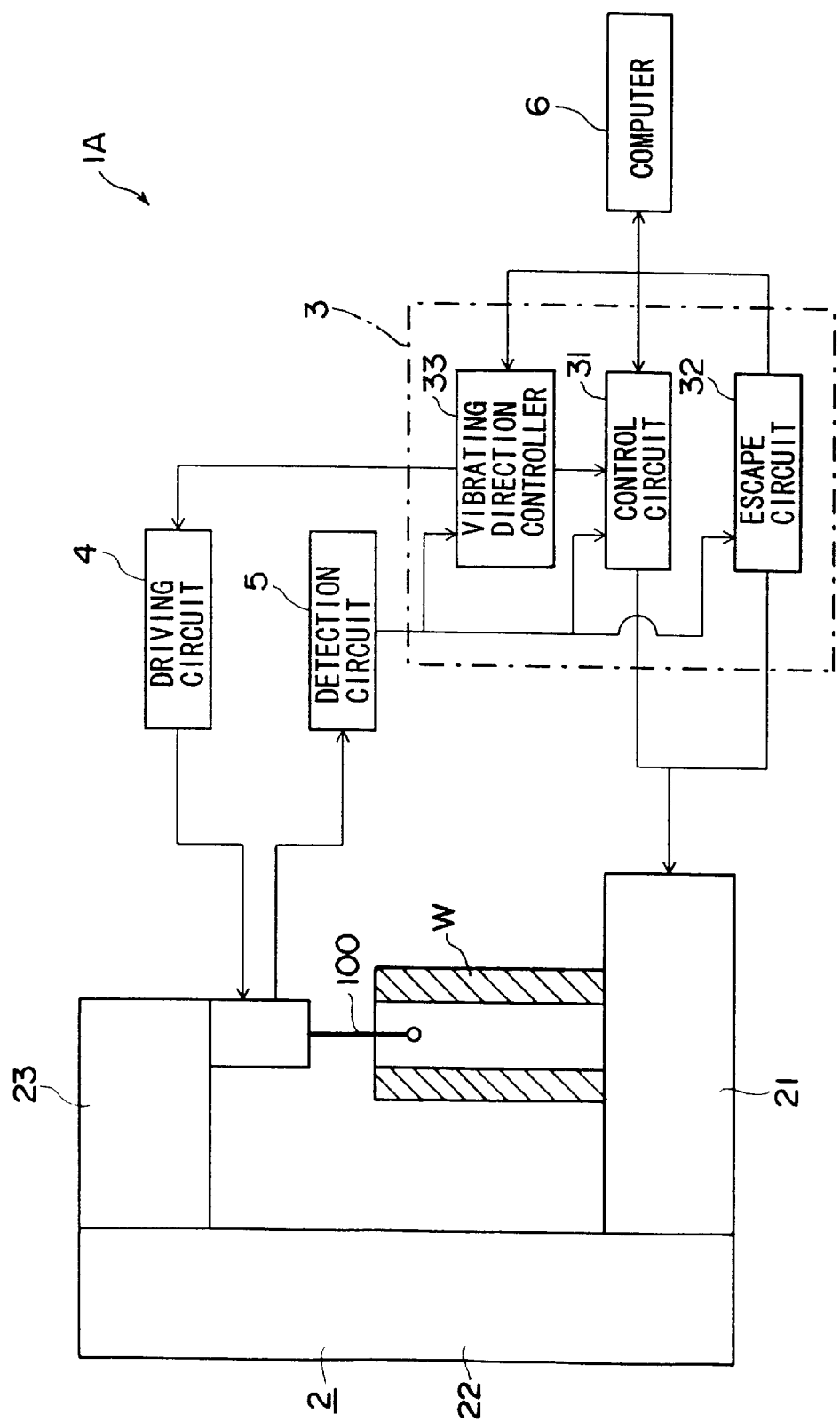
FIG. 22 is a schematic view showing a movement control mechanism of a contact-type vibrating probe according to the fifth embodiment of the present invention.
Figure 23:
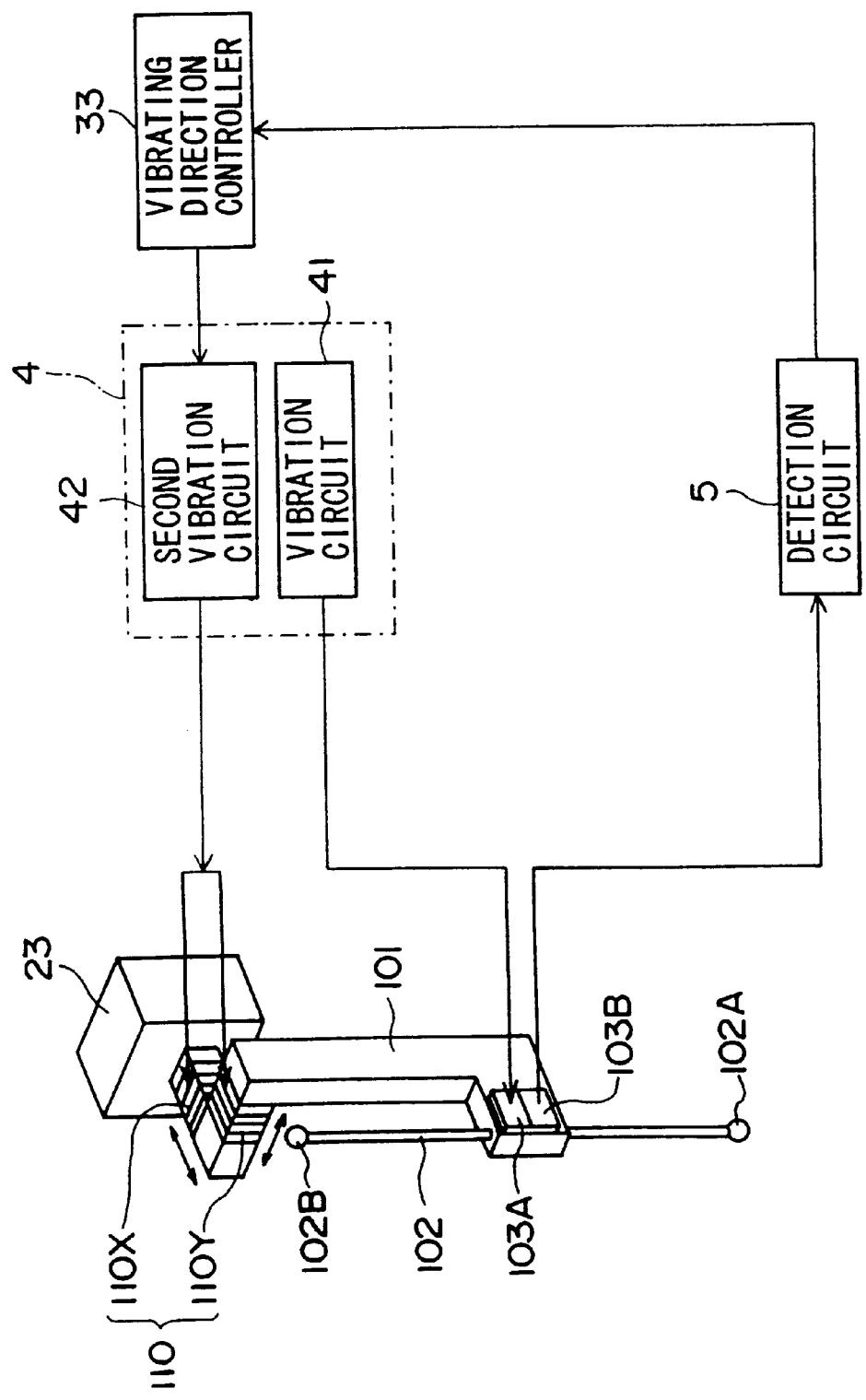
FIG. 23 is a schematic view showing a structure of the contact vibrating probe of the fifth embodiment.
Figure 24:
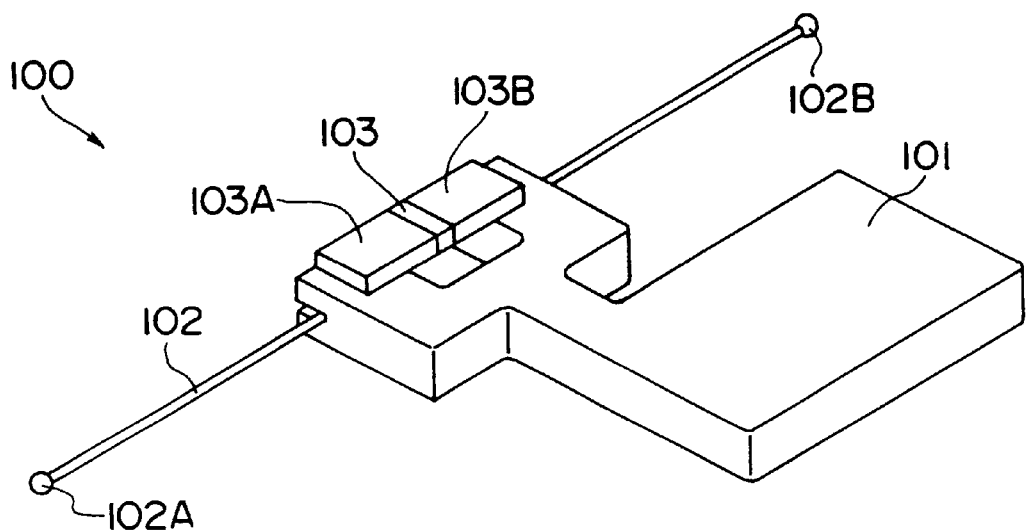
FIG. 24 is a summarized perspective view showing a structure of a conventional contact-type vibrating probe.

As shown in FIG. 22, the profiling measuring machine 1A has a measuring machine body 2, a controller 3, a driving circuit 4, a detection circuit 5, a computer 6, and a contact-type vibrating probe 100. Since the arrangement of the respective components are the same as the above-described first embodiment, the same reference numeral will be attached to the same component to omit description thereof.

Only components characteristic to the present embodiment will be described below.

In FIG. 22, the controller 3 controls the movement of the support body 23, which includes a vibrating direction controller 33 as well as the control circuit 31 and the escape circuit 32.

The vibrating direction controller 33 controls the vibrating direction of the stylus 102 by the second vibrator 110 based on the detection signal $\overline{V}$ inputted from the detection circuit 5. More specifically, the vibrating direction controller 33 outputs a control signal to the second vibration circuit 42 and adjusts the amplitude of the X-axis vibration element 110X and the Y-axis vibration element 110Y to find a combination of the X-axis vibration element 110X and the Y-axis vibration element 110Y where the change in the detection signal $\overline{V}$ is the smallest, thus controlling vibrating direction of the stylus 102 and detecting end surface direction of the workpiece W.

Next, operation of the above-described profiling measuring machine 1 will be described below.

Initially, control signal is outputted from the computer 6 to the controller 3 to actuate the control circuit 31 to move the support body 23, so that the contact portion 102A touches the end surface of the workpiece W for applying a predetermined contact force. Incidentally, whether the predetermined contact force is applied or not is determined by whether the detection signal $\overline{V}$ from the detection signal is at the predetermined threshold value while the stylus 102 is vibrated in the axial direction by the vibrator 103A.

Next, while applying the predetermined contact force, the control signal is outputted from the vibrating direction controller 33 to the second vibration circuit 42 to initiate vibration by the second vibrator 110. The vibrating direction controller 33 outputs the control signal to the second vibration circuit 42 to adjust vibrating direction of the second vibrator while watching the detection signal $\overline{V}$ from the detection circuit 5, and sets the vibrating direction where the change in the detection signal $\overline{V}$ becomes the smallest.

Specifically, when the second vibration circuit 42 vibrates each of the X-axis vibration element 110X and the Y-axis vibration element 110Y by the same frequency f2, the vibrating direction of the contact portion 102A is a composition of the vibration by the X-axis vibration element 110X and the Y-axis vibration element 110Y on a plane orthogonal with the axis of the stylus 102. For instance, when the frequency, phase, and amplitude of both vibrations are identical, the vibrating direction of the composite vibration is 45 degrees relative to the X-axis and amplitude thereof is approximately 1.4 (root of two) times as large as the original vibration. By appropriately controlling amplitude and phase of the vibration signal applied to the X-axis vibration element 110X and the vibration signal applied to the Y-axis vibration element 110Y by the vibrating direction controller 33, the vibrating direction can be changed in the the range from 0 to 180 degrees and the amplitude of the vibration can be made constant.

By observing the change in the detection signal $\overline{V}$ while changing the vibrating direction and obtaining the vibrating direction where the change becomes the smallest, the end surface direction is determined as the vibrating direction at the time. When the contact portion 102A is in contact with the workpiece W, the vibrating direction controller 33 can detect the end surface direction of the workpiece W and can set the vibrating direction of the stylus 102 in the end surface direction of the workpiece W by appropriately changing the vibrating direction of the contact portion 102A.

When an approximate configuration of the workpiece W is known, the vibrating direction of the contact portion can be set by teaching the end surface direction of the workpiece W to the vibrating direction controller 33. On the other hand, when the approximate configuration of the workpiece W is not known, the vibrating direction of the contact portion 102A can be set by the end surface direction of the workpiece W detected by the vibrating direction controller 33.

The control circuit 31 outputs a control signal to move the support body 23 along the vibrating direction set by the vibrating direction controller 33, thus initiating scanning of the end surface of the workpiece W.

When the detection signal $\overline{V}$ from the detection circuit 5 becomes greater as compared to the initiation of the measurement while scanning the surface of the workpiece W by moving the support body 23, the end face of the workpiece W is considered to be curved in a direction away from the contact portion 102A. Then, the control circuit 31 outputs a control signal for moving the support body 23 in a direction for the contact portion 102A to move toward the end surface of the workpiece W based on the change in the state quantity of the detection signal $\overline{V}$. On the other hand, when the detection signal $\overline{V}$ becomes smaller than the initiation of the measurement, the end surface of the workpiece W is curved in a direction for the contact portion 102A to move toward. Accordingly, the control circuit 31 outputs a control signal to the support body 23 for the contact portion 102A to move away from the end surface of the workpiece W.

Figure 2:
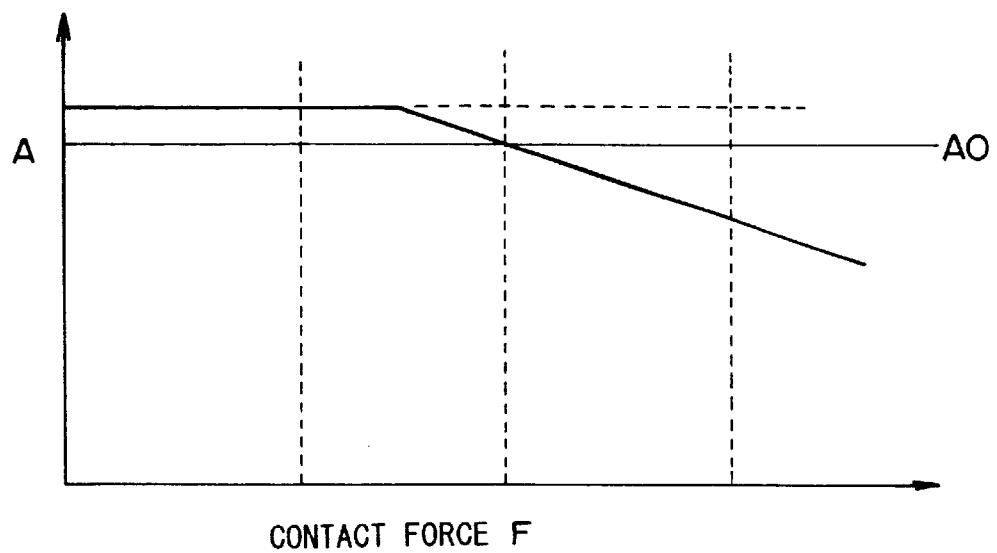
FIG. 2 is a graph for illustrating a first embodiment of the present invention.

When the control is conducted by the control circuit 31 to minimize the change in the status quantity of the detection signal $\overline{V}$ while the contact portion 102A is in touch with the workpiece W, the stylus 102 can maintain minimum contact force against the workpiece W. Further, when the contact portion 102A is not in contact with the workpiece, the non-contact state of the contact portion 102A against the workpiece W can be detected when the amplitude A of the detection signal $\overline{V}$ in FIG. 2 shows maximum value or when the change in status quantity is not generated even when the vibrating direction changes. Incidentally, accompanying the movement control of the support body 23 by the control circuit 31, the vibrating direction of the stylus 102 is controlled by the vibrating direction controller 31 based on the change in the detection signal $\overline{V}$.

When the contact portion 102A reaches a wall of a curved surface of the workpiece blocking the advance direction of the contact-type vibrating probe 100 and while scanning the surface of the workpiece W according to the above-described process and change in the state quantity of the detection signal $\overline{V}$ cannot be maintained at a constant level, the movement control of the support body 23 by the control circuit 31 is stopped and the movement of the support body 23 is controlled by the escape circuit 32. Incidentally, the control signal from the escape circuit 32 is a control signal opposite to the advance direction of the contact-type vibrating probe 100 by the control signal of the control circuit 31, which is outputted until the contact portion 102A and the workpiece W are not in contact with each other.

According to the above-described embodiment, the following effects can be obtained.

Since the stylus 102 vibrates along the end surface of the workpiece W by the second vibrator 110 and the movement of the support body 23 is controlled by the control circuit 31 so that the change in state quantity of the detection $\overline{V}$ detected by the detection circuit 5 is constant, the stylus 102 can move along the surface of the workpiece W, thus conducting profiling measurement using the contact-type vibrating probe 100. Further, the configuration of the workpiece W can be measured with high accuracy with use of the contact-type vibrating probe 100.

Further, since the profiling measuring machine 1 has the vibrating direction controller 33, the vibrating direction of the relative vibration by the second vibrator 110 can be modified in a direction along the end surface of the workpiece W in accordance with the change in the state quantity of the detection signal $\overline{V}$. Accordingly, since the vibrating direction of the contact portion 102A touching the workpiece W by the frequency f2 can be always maintained in the end surface direction of the workpiece, profiling measurement and continuous measurement of the workpiece W are possible without grasping the approximate configuration of the workpiece W in advance.

Further, since the above-described profiling measuring machine 1 has the escape circuit 32, the damage on the workpiece W and/or the contact-type vibrating probe 100 can be prevented by controlling the movement of the support body 23 by the escape circuit 32.

[Sixth Embodiment]

Next, the sixth embodiment of the present invention will be described below.

The present embodiment is basically the same as the above-described fifth embodiment except that the vibrator and the second vibrator are integrally provided around the axis of the stylus constituting the contact-type vibrating probe.

In other words, though the contact-type vibrating probe 100 is used in the fifth embodiment, the contact-type vibrating probe 200 shown in FIGS. 16 and 17 is used in the present embodiment. The arrangement of the contact-type vibrating probe 200 is identical with the second embodiment and description thereof is omitted here.

For measuring the inside wall of the small hole W by the contact-type vibrating probe 200, the vibrating direction may be successively adjusted by the vibrating direction controller in accordance with the change in the detection signal $\overline{V}$ as well as moving the support body in the same manner as the fifth embodiment. On the other hand, the central position coordinate O and radius R of the inner diameter of the small hole may be measured (see FIG. 15) in advance by three-point method etc. and approximate locus for the stylus 102 to move may be given to the vibrating direction controller. Then, while the contact portion 102A is in contact with the inside wall of the small hole W, the stylus 102 is vibrated in the axial direction and in a direction along the inside wall by the piezoelectric elements 203A and 203B as the vibration element.

According to the present embodiment, the effects of the second embodiment can be obtained as well as the effects of the fifth embodiment.

[Seventh Embodiment]

Next, the seventh embodiment of the present invention will be described below.

The present embodiment is basically the same as the above-described fifth embodiment except that six piezoelectric elements are provided at an equal interval on the outer circumference of the cylindrical body 302 for the stylus 102 to be inserted, as shown in FIG. 18 and 19.

In other words, though the contact-type vibrating probe 100 is used in the fifth embodiment, the contact-type vibrating probe 300 shown in FIGS. 18 and 19 is used in the present embodiment. The arrangement of the contact-type vibrating probe 300 is the same as the third embodiment and description thereof is omitted here.

According to the present embodiment, the effects of the third embodiment can be obtained as well as the effects of the fifth embodiment.

[Eighth Embodiment]

Next, the eighth embodiment of the present invention will be described below.

The present embodiment is basically the same as the above-described fifth embodiment except that a plurality of piezoelectric elements 403A is provided on the cylindrical body 402 for the axis of the stylus 102 and the piezoelectric element 103A is provided on the centroid position of the stylus 102, the piezoelectric elements 403A being the second vibrator and the piezoelectric element 103A being the vibrator.

In other words, though the contact-type vibrating probe 100 is used in the fifth embodiment, the contact-type vibrating probe 400 shown in FIGS. 20 and 21 is used in the present embodiment. The arrangement of the contact-type vibrating probe 400 is the same as the fourth embodiment and description thereof is omitted here.

According to the present embodiment, the effects of the fourth embodiment can be obtained as well as the effects of the fifth embodiment.

[Modification]

Incidentally, the scope of the present invention is not restricted in the above-described respective embodiments but includes following modifications.

Though the movement control mechanism of the contact-type vibrating probe according to the first embodiment is used for measuring the inside wall of the small hole W1, the usage is not limited. For instance, the present invention may be utilized for continuously measuring the outer circumference of the cylindrical workpiece and other workpieces having three-dimensionally complicated configurations.

Further, though the vibrator and the second vibrator are composed of the piezoelectric elements 203A and 203B in the second and the sixth embodiments, the vibrator and the second vibrator may be composed of the other arrangement. In short, other arrangements can be used as long as the vibrator and the second vibrator can vibrate the stylus at a predetermined frequency in the axial direction and in a direction orthogonal with the axis.

Other arrangements and configurations are possible for implementing the present invention as long as an object of the present invention can be achieved.

What is claimed is:

1. A movement control mechanism for controlling movement of a contact-type vibrating probe, the contact-type vibrating probe having a stylus defining an axis therein provided with a contact portion to be in contact with a workpiece at a tip end of the contact portion, a stylus holder for supporting the stylus, a first vibrator for resonating the stylus at frequency f1 in an axial direction, and a detector for detecting a change in vibration of the stylus by the first vibrator, the movement control mechanism comprising:

a support body mechanically connected to the stylus holder to move in threedimensional space at a predetermined velocity vector in accordance with an external command;

a second vibrator for vibrating the stylus relative to the workpiece at frequency f2 in a direction orthogonal with the axial direction of the stylus and also normal to a surface of the workpiece; and a controller for controlling movement of the support body so that a state of a detection signal detected by the detector in accordance with contact of the contact portion with the end surface of the workpiece remains substantially constant when the contact portion touches the end surface of the workpiece while vibrating the stylus by the second vibrator.

2. The movement control mechanism of the contact-type vibrating probe according to claim 1, wherein the controller moves the support body in a direction orthogonal with a normal line to the surface of the workpiece.

3. A movement control mechanism for controlling movement of a contact-type vibrating probe, the contact-type vibrating probe having a stylus defining an axis therein provided with a contact portion to be in contact with a workpiece at a tip end of the contact portion, a stylus holder for supporting the stylus, a first vibrator for resonating the stylus frequency f1 in an axial direction, and a detector for detecting a change in vibration of the stylus by the first vibrator, the movement control mechanism comprising:

a support body mechanically connected to the stylus holder to move in three-dimensional space at a predetermined velocity vector in accordance with an external command;

second vibrator for relatively vibrating the stylus relative to the workpiece at a frequency f2 along a surface of the workpiece; and a controller for controlling movement of the support body or the workpiece so that a state of a detection signal detected by the detector in accordance with contact of the contact portion with the surface of the workpiece remains substantially constant when the contact portion touches the end surface of the workpiece while vibrating the stylus by the second vibrator.

4. The movement control mechanism of a contact-type vibrating probe according to claim 3, wherein the controller controls the movement of the support body or the workpiece so that the state of the detection signal in accordance with the contact of the contact portion with the end surface of the workpiece becomes the smallest when the contact portion is in contact with the surface of the workpiece while vibrating the stylus by the second vibrator.

5. The movement control mechanism of a contact-type vibrating probe according to claim 3, further comprising a vibrating direction controller for controlling vibrating direction by the second vibrator so that, when the contact portion touches the surface of the workpiece and the stylus is vibrated by the second vibrator, so that a minimized state of the detection signal remains substantially constant.

6. The movement control mechanism of a contact-type vibrating probe according to claim 3, wherein the controller relatively moves the support body toward the surface of the workpiece.

7. The movement control mechanism of a contact-type vibrating probe according to claim 1, further comprising an escape circuit for suspending the movement control by the controller when the change in the state of the detection signal cannot be maintained at a constant level and for moving the support body so that the contact portion is not in contact with the end surface of the workpiece.

8. The movement control mechanism of a contact-type vibrating probe according to claim 1 or 3, wherein the vibrator and the second vibrator include more than one vibration element disposed around the axis of the stylus at a predetermined angle.

9. The movement control mechanism of a contact-type vibrating probe according to claim 8, wherein the predetermined angle is 90 degrees.

10. The movement control mechanism of a contact-type vibrating probe according to claim 1, wherein the first vibrator and the second vibrator include more than two vibration elements disposed around the axis of the stylus at an equal interval.

11. The movement control mechanism of a contact-type vibrating probe according to claim 8, wherein the vibration element is a piezoelectric element.

12. The movement control mechanism of a contact-type vibrating probe according to claim 10, wherein the vibration element is a piezoelectric element.

13. The movement control mechanism of a contact-type vibrating probe according to claim 1, wherein the second vibrator vibrates the stylus holder in any two directions mutually orthogonal with the axis of the stylus.

14. The movement control mechanism of a contact-type vibrating probe according to claim 13, wherein the second vibrator has a first vibration element for vibrating the stylus holder in one direction and a second vibration element extending from the first vibrating element for vibrating the stylus holder in the other direction.

15. The movement control mechanism of a contact-type vibrating probe according to claim 13, wherein the second vibrator vibration elements disposition for vibrating the stylus holder in one direction and another vibrator for vibrating the stylus holder in the other direction.

* * * * *